(12) United States Patent
Mays et al.

(10) Patent No.: US 9,731,862 B2
(45) Date of Patent: *Aug. 15, 2017

(54) NESTABLE WIPES CONTAINER

(71) Applicant: The Procter & Gamble Company, Cincinnati, OH (US)

(72) Inventors: Richard Shane Mays, Cincinnati, OH (US); Richard Lawrence Horstman, Cincinnati, OH (US); Lucio Frias, Madeira, OH (US); William Kater LaSala, Mason, OH (US); James Matthew Owen, Denver, CO (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,464

(22) Filed: Feb. 12, 2015

(65) Prior Publication Data

US 2015/0158631 A1 Jun. 11, 2015

Related U.S. Application Data

(63) Continuation of application No. 13/750,335, filed on Jan. 25, 2013, now Pat. No. 8,985,334.

(51) Int. Cl.
*B65D 21/02* (2006.01)
*B65G 1/00* (2006.01)
(Continued)

(52) U.S. Cl.
CPC ..... *B65D 21/0233* (2013.01); *B65D 21/0215* (2013.01); *B65D 43/16* (2013.01);
(Continued)

(58) Field of Classification Search
CPC B65D 21/0215; B65D 21/0233; B65D 21/04; B65D 21/043; B65D 21/045–21/046; B65D 43/12
(Continued)

(56) References Cited

U.S. PATENT DOCUMENTS 2,814,427 A * 11/1957 Emery .................. 229/406
3,396,868 A 8/1968 Fitzgerald
(Continued)

OTHER PUBLICATIONS

PCT International Search Report, dated Sep. 15, 2014, 12 pages.

*Primary Examiner* — Chun Cheung
*Assistant Examiner* — Brijesh V. Patel
(74) *Attorney, Agent, or Firm* — Christian M. Best; James T. Fondriest (57) ABSTRACT

The present disclosure includes a nestable containing for storing and dispensing wipes. The nestable container includes a container body comprising a bottom wall, side walls, and a corner region including an interior surface and an opposing exterior surface. The nestable container includes a first ledge and a second ledge. The first and second ledges each have a proximal end region and a distal end region. The proximal end region of the first ledge is connected with the exterior surface of the corner region. The proximal end region of the first ledge comprises a groove and the distal end region of the first ledge comprises a ridge. The proximal end region of the second ledge is connected with the interior surface of the corner region. The proximal end region of the second ledge comprises a groove and the distal end region of the second ledge comprises a ridge.

19 Claims, 9 Drawing Sheets

(51) Int. Cl.
　　　*B65D 43/16*　　　(2006.01)
　　　*B65G 57/16*　　　(2006.01)

(52) U.S. Cl.
　　　CPC ............ *B65D 43/162* (2013.01); *B65G 1/00* (2013.01); *B65G 57/165* (2013.01)

(58) Field of Classification Search
　　　USPC .......... 206/499, 503–505, 515–519; 220/780
　　　See application file for complete search history.

(56) References Cited

U.S. PATENT DOCUMENTS

| | | | |
|---|---|---|---|
| 3,434,625 A * | 3/1969 | Embry, Jr. ............... | 220/495.06 |
| RE26,758 E * | 1/1970 | Kreeger ............... | B65D 21/045 |
| | | | 206/507 |
| 3,680,735 A * | 8/1972 | Lucas ........................ | 206/511 |
| 3,773,213 A * | 11/1973 | Fredrick .................... | 206/507 |
| 4,113,095 A | 9/1978 | Dietz et al. | |
| 4,205,749 A * | 6/1980 | Carroll .................. | B65D 21/045 |
| | | | 206/504 |
| 4,426,001 A * | 1/1984 | Stahl .................... | B65D 21/046 |
| | | | 206/505 |
| 5,012,928 A | 5/1991 | Proffitt et al. | |
| 5,105,947 A * | 4/1992 | Wise ........................ | 206/519 |
| 5,242,696 A | 9/1993 | McDevitt | |
| 5,375,719 A | 12/1994 | Mittmann et al. | |
| 5,439,113 A * | 8/1995 | Elvin-Jensen ............. | 206/509 |
| 5,445,273 A * | 8/1995 | Apps ........................... | 206/505 |
| 5,555,996 A | 9/1996 | Lang-Ree et al. | |
| 5,752,602 A * | 5/1998 | Ackermann et al. ......... | 206/507 |
| 5,860,527 A | 1/1999 | Frankenberg et al. | |
| RE36,867 E | 9/2000 | Rozzano | |
| 6,237,758 B1 * | 5/2001 | Hsu .......................... | 206/203 |
| 6,394,274 B1 | 5/2002 | Cheeseman | |
| 6,523,690 B1 | 2/2003 | Buck et al. | |
| 7,721,891 B2 * | 5/2010 | Dubois ................ | B65D 21/045 |
| | | | 206/507 |
| 7,938,286 B2 * | 5/2011 | Vogel et al. .................. | 220/276 |
| 7,967,142 B2 * | 6/2011 | Barbalho .................... | 206/507 |
| 8,356,725 B2 | 1/2013 | Kies et al. | |
| 2003/0052133 A1 * | 3/2003 | Hayes et al. ................ | 220/835 |
| 2006/0113210 A1 * | 6/2006 | Hassell et al. ............... | 206/519 |
| 2006/0180491 A1 * | 8/2006 | Zephir et al. ................ | 206/507 |
| 2006/0254948 A1 | 11/2006 | Herbert et al. | |
| 2007/0116806 A1 * | 5/2007 | Parsons ..................... | 426/107 |
| 2008/0023426 A1 * | 1/2008 | Stahl ........................ | A47F 3/14 |
| | | | 211/126.7 |
| 2008/0164175 A1 * | 7/2008 | Meissen .................... | 206/506 |
| 2009/0308883 A1 | 12/2009 | Blumenschein | |
| 2011/0139785 A1 * | 6/2011 | Strange et al. .............. | 220/283 |
| 2012/0074142 A1 | 3/2012 | Mays et al. | |
| 2013/0264242 A1 | 10/2013 | Wojno | |

* cited by examiner

નેસ્ટેબલ વાઇપ્સ

# NESTABLE WIPES CONTAINER

CROSS REFERENCE TO RELATED APPLICATION

This application is a continuation of U.S. patent application Ser. No. 13/750,335, filed on Jan. 25, 2013, the entire disclosure of which is hereby incorporated by reference.

FIELD OF THE INVENTION

The present disclosure includes a nestable container for storing and dispensing wipes. In particular, the nestable container comprises various features that allow a plurality of nestable containers to be stacked on top of each other without adjacent nestable containers sticking together.

BACKGROUND OF THE INVENTION

Wet wipes are known in the art as an implement for applying, removing, or simultaneously applying and removing substances to and from a surface. For example, wipes may be used to apply emollients and remove exudates from the skin when changing a diaper. Such wipes are generally provided in a package, which may be a rigid or semi-rigid container. A rigid or semi-rigid container may provide a convenient and aesthetically pleasing storage solution for regular use. In some instances, it may be desirable for a wipes container to be relatively lightweight. A lightweight container may be easier to handle while also minimizing material costs. In order to provide a lightweight container, the walls of the container may need to be relatively thin and made of a lightweight material such as plastic. The containers may be nestable such that a plurality of containers may stack on top of each other.

In some processes, nestable containers may be manufactured in one facility and then may be shipped to another facility to be filled with wet wipes. For purposes of shipping and handling, the containers may be stacked on top of each other. During the shipping process, the stacks of nestable, thin-walled containers may be subjected to various forces that may cause the walls of the container to deform. If a container deforms, the container may get stuck inside of an adjacent container in the stack of containers. Once the stacks of containers are at the wipes packaging facility, the stacks of containers may be fed to the wipes packaging process. An apparatus may be used to separate the nested containers from the stack. However, the separating apparatus may not be able to separate containers that are stuck together in shipment. As a result, containers that are stuck together may get jammed in the packaging equipment or may cause damage to the packaging equipment. The wipes packaging process may have to be shut down in order to remove the jammed containers or to repair damaged equipment.

Therefore, it would be beneficial to provide a nestable, thin-walled container that is able to be stacked with a plurality of similar thin-walled containers without the nestable containers sticking together.

SUMMARY OF THE INVENTION

The present disclosure includes a nestable container comprising a container body. The container body comprises a bottom wall, side walls, and a corner region. The corner region includes an interior surface and an opposing exterior surface. The nestable container comprises a first ledge including a proximal end region and a distal end region. The proximal end region is connected with the interior surface of the corner region. The proximal end region of the first ledge comprises a groove and the distal end region of the first ledge comprises a ridge. The nestable container comprises a second ledge including a proximal end region and a distal end region. The proximal end region is connected with the exterior surface of the corner region. The proximal end region of the second ledge comprises a groove and the distal end region of the second ledge comprises a ridge.

The present disclosure includes a nestable container comprising a container body. The container body comprises a bottom wall, side walls, and a corner region. The corner region includes an interior surface and an opposing exterior surface. The nestable container comprises a ledge including a proximal end region and a distal end region. The proximal end region is connected with the exterior surface of the corner region. The nestable container comprises a rib protruding from the interior surface of the corner region and extending from the second ledge toward the bottom wall.

The present disclosure includes a method of stacking nestable containers. The method comprises the steps of: providing a first container having a container body, the container body comprising a bottom wall, a corner region including an interior surface and an opposing exterior surface, and a ledge protruding the from the interior surface and including a groove; providing a second container having a container body, the container body comprising a bottom wall, a corner region including an interior surface and an opposing exterior surface, and a ledge protruding the from the exterior surface and including a ridge; stacking the container body of the second container on the container body of the first container; and inserting the ridge into the groove.

DETAILED DESCRIPTION OF THE INVENTION

The following definitions may be useful in understanding the present disclosure:

As used herein, "thickness" refers to the smallest of three dimensions of a component. For example, a component may have a length, width, and a thickness.

As used herein, "nest," "nesting," and "nestable" refers to an exterior of a container fitting into the interior of an adjacent container.

The present disclosure relates to nestable containers. In particular, the present disclosure relates to nestable containers that are adapted to stack on top of each other without sticking together. For example, a stack of nestable containers may include a first container and a second container. Each nestable container includes a container body comprising a bottom wall, a plurality of side walls, and a corner region. The corner region includes an interior surface and an opposing exterior surface. The corner region may be defined by a bottom edge located adjacent to the bottom wall and a top edge located along an edge most distal from the bottom wall. The nestable containers may include a first ledge and a second ledge. The first ledge includes a proximal end region and a distal end region. The proximal end region of the first ledge is connected with the interior surface of the corner region. The proximal end region of the first ledge may comprise a groove and the distal end region of the first ledge may comprise a ridge. The second ledge also includes a proximal end region and a distal end region. The proximal end region of the second ledge is connected with the exterior surface of the corner region. The proximal end region of the second ledge may comprise a groove and the distal end region of the second ledge may comprise a ridge.

The first and second nestable containers may be adapted to stack on top of each other. For example, the second nestable container may stack on top of the first nestable container. In particular, the container body of the second container may nest into the container body of the first nestable container. The ridge of the second ledge of the second nestable container may fit into the groove of the first ledge of the first nestable container. Similarly, the ridge of the first ledge of the first nestable container may fit into the groove of the second ledge of the second nestable container.

To provide additional strength to the corner regions of the nestable containers, the nestable containers may include a first rib protruding from the interior surface of the corner region and extending from the second ledge toward the bottom wall. The nestable containers may include a second rib protruding from the interior surface of the corner region and extending from the first ledge toward the top edge of the corner region. The second rib may help to restrict movement of the second ledge of the second nestable container as the second ledge rests on the first ledge of the first nestable container.

The nestable containers of the present disclosure may be useful for storing and dispensing wet wipes. While the present disclosure discusses nestable containers in the context of storing and dispensing wet wipes, it is to be appreciated that the nestable containers of the present disclosure may be used to store and dispense various types of substrates, as well as various other consumer products. For example, the nestable containers may be used to store dry wipes, tissues, paper towels, napkins, and absorbent articles.

FIGS. 1A, 2A, and 3-8 show a nestable container 100 having a container body 102 and a lid 104. The container body 102 may include a bottom wall 108 and a plurality of side walls 106 connected with the bottom wall 108. The container body 102 may include an interior space 126 and an exterior space 128. The container body 102 may have an open end 170 opposite of the bottom wall 108. Adjacent side walls 106 may be connected in a corner region 110 of the container body 102. The side walls 106 may comprise first and second opposing side walls 106a and 106b and third and fourth opposing side walls 106c and 106d. The first and third side walls 106a and 106c may join together at a first corner region 110a; the second and third side walls 106b and 106c may join together at a second corner region 110b; the second and fourth side walls 102b and 106d may join together at a third corner region 110c; and the first and fourth side walls 106a and 106d may join together at a fourth corner region 110d.

Figures 1A, 1B:
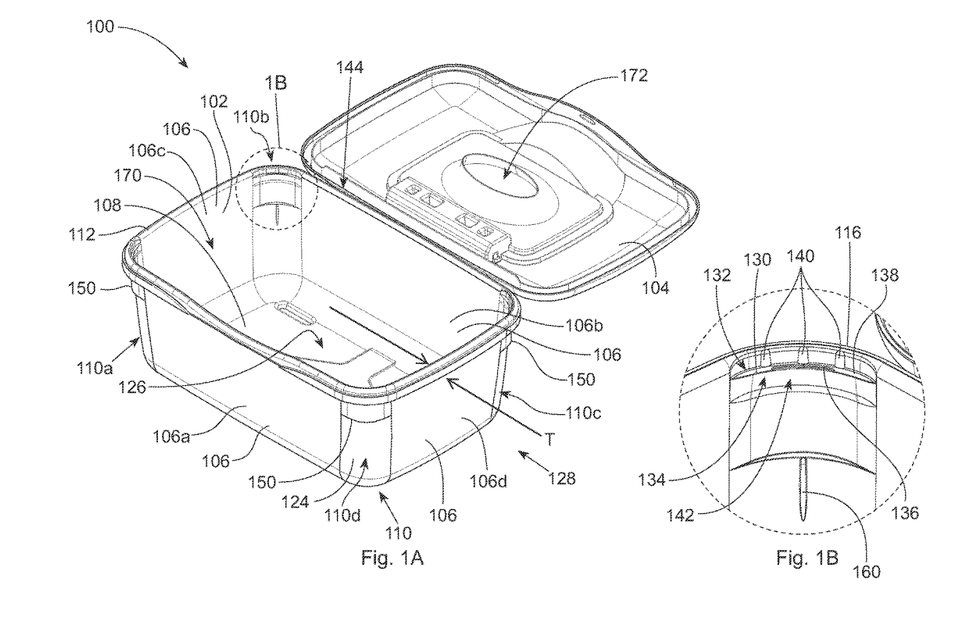
FIG. 1A is a side, perspective view of a nestable container having a lid in an open configuration.
FIG. 1B is a magnified view of a portion of a nestable container taken from FIG. 1A.
Figures 2A, 2B:
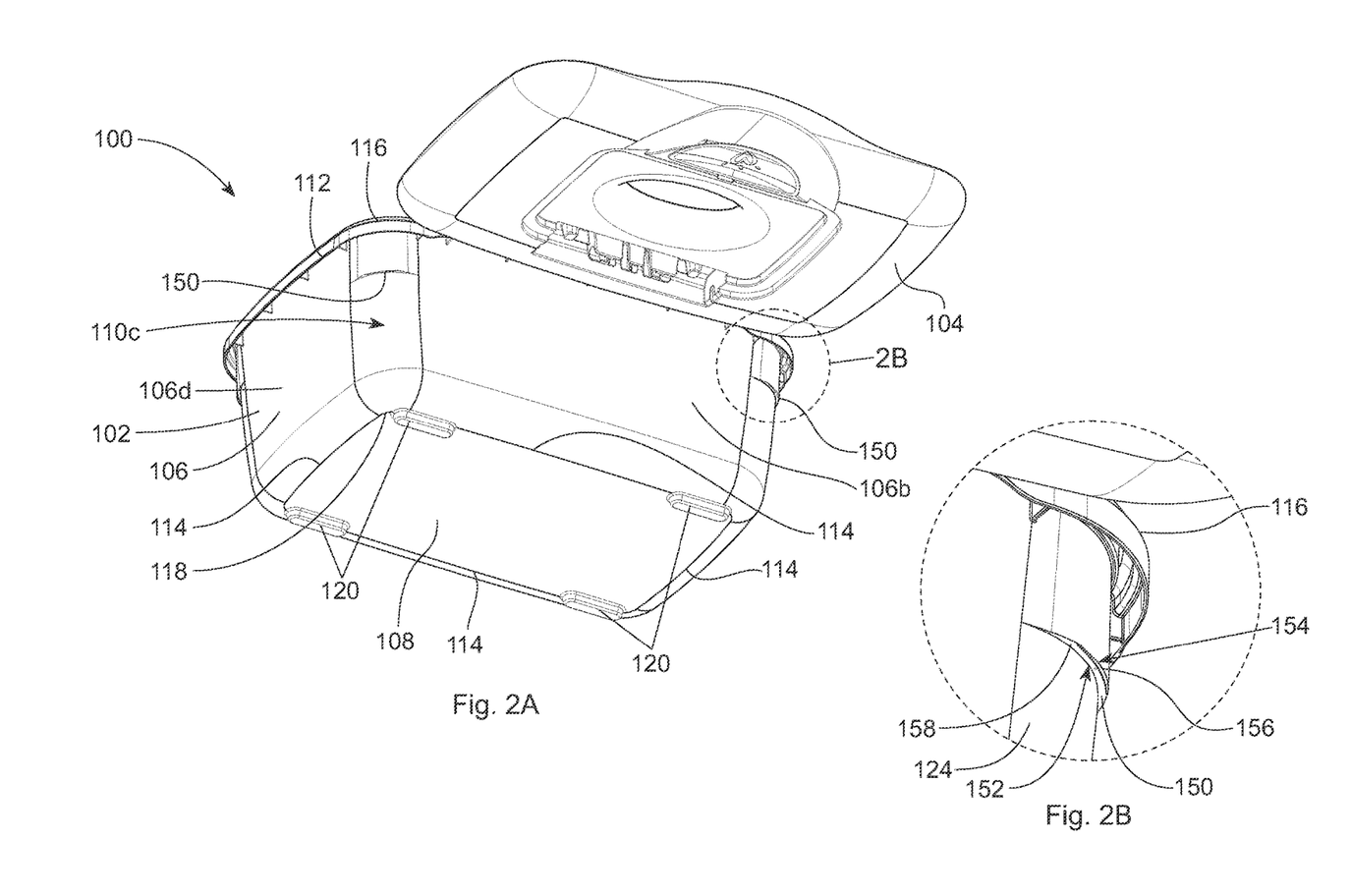
FIG. 2A is a bottom, perspective view of a nestable container having a lid in an open configuration.
FIG. 2B is a magnified view of a portion of a nestable container taken from FIG. 2A.
Figure 3:
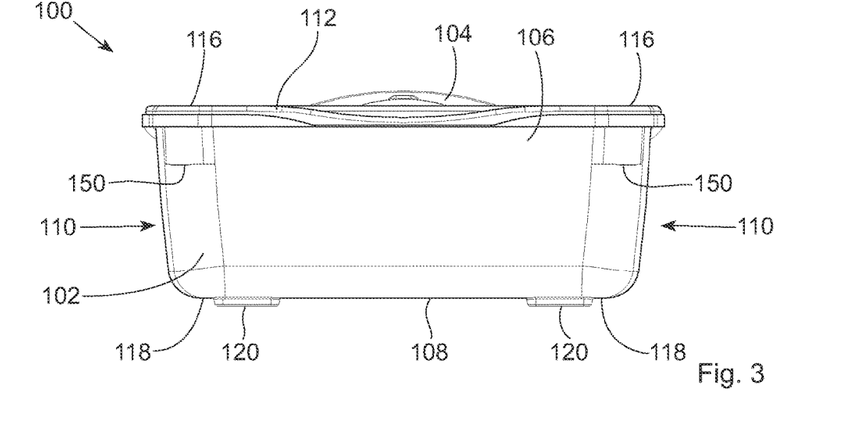
FIG. 3 is a front, elevation view of a nestable container.

The nestable container 100 may be in the form of a rigid or semi-rigid structure. In some exemplary configurations, the container body 102 and the lid 104 may be made of a lightweight thermoplastic material. As shown in FIGS. 1A and 2A, the container body 102 may be substantially rectangular in shape. It is to be appreciated that the container body may have various shapes and configurations.

With reference to FIG. 2A, each side wall 106 may define a bottom edge 114 located adjacent to the bottom wall 108 and an opposing top edge 112 located along an edge most distal from the bottom wall 108. Each side wall 106 may connect with the bottom wall 108 along the bottom edge 114 of the side wall 106. The bottom edge 114 of the side walls 106 may be curved as shown in FIGS. 2A and 2B. In some exemplary configurations, the bottom edge 114 may be square such that the side wall 106 and the bottom wall 108 form a 90-degree angle to each other. The side walls 106 may slope outward from the bottom edge 114 to the top edge 112. It is to be appreciated that sloped side walls 106 allow the nestable container 100 to nest with a second, nestable container. The side walls 106 may be substantially flat, or in some exemplary configurations, the side walls 106 may curve from the bottom edge 114 to the top edge 112.

As shown in FIG. 1A, the side walls 106 have a thickness, T. In some exemplary configurations, the thickness, T, of a side wall 106 may be uniform such that the thickness, T, is the same from the top edge 112 to the bottom edge 114 and from one corner region 110 to the opposite corner region 110 of the side wall 106. In other exemplary configurations, the thickness, T, of the side walls 106 may be non-uniform. The thickness, T, of each of the first, second, third, and fourth side walls 106a, 106b, 106c, and 106d may be substantially the same. However, in some exemplary configurations, the thickness, T, of one or more side walls 106 may be different from the remaining side walls 106. The thickness, T, of the side walls 106 may be relatively small. For example, the thickness, T, may be less than 1 millimeter, less than 2 millimeters, or less than 3 millimeters.

As shown in FIGS. 1A and 2A, the corner region 110 joins adjacent side walls 106. The corner region 110 may extend continuously from one side wall 106 to an adjoining side wall 106 such that there is no demarcation between a side wall 106 and the corner region 110. The corner regions 110 each include an interior surface 122 and an exterior surface 124. The corner regions 110 may each define a bottom edge 118 located adjacent to the bottom wall 108 and an opposing top edge 116 located along an edge most distal from the bottom wall 108. The corner region 110 may have a curved shape. For example, the corner region 110 may curve from one side wall 106 to the adjoining side wall 106, as shown in FIGS. 1A and 2A. It is to be appreciated that curved corner regions may make the nestable container safer and more comfortable to grasp, especially for children. However, in some exemplary applications, it may be useful for the corner region 110 to be square such that adjacent side walls 106 form a 90-degree angle to each other.

The corner region 110 may have a thickness. The corner region 110 may have substantially the same thickness, T, as the adjacent side walls 106. Or, in some exemplary configurations, the thickness of the corner region 110 may be greater than the thickness, T, of the side walls 106. It is to be appreciated that a greater thickness in the corner region 110 of the container body 102 as compared to the side walls 106 may minimize the potential for the container body 102 to deform and collapse into an adjacent container body in a stack of nestable containers.

The corner regions 110 may include ledges that allow adjacent container bodies 102 to nest together. For example, the corner region 110 may include a first ledge 150 such as shown in FIG. 2B, and a second ledge 130 such as shown in FIG. 1B. As shown in FIG. 2B, the first ledge 150 may include a proximal end region 152 and a distal end region 154. The proximal end region 152 of the first ledge 150 may be connected with the exterior surface 124 of the corner region 110. As shown in FIG. 1B, the second ledge 130 may include a proximal end region 132 and a distal end region 134. The proximal end region 132 of the second ledge 130 may be connected with the interior surface 122 of the corner region 110. The second ledge 130 is positioned between the top edge 116 and the first ledge 150. The first ledge 150 may be positioned relatively near to the top edge 116 of the corner region 110 than to the bottom edge 118 of the corner region 110. As discussed in more detail below, when multiple nestable containers 100 are stacked on top of each other, the first ledge 150 of a corner region 110 is adapted to rest on a second ledge of an adjacent nestable container. The degree of nesting between adjacent nestable containers may be dependent upon the positioning of the first and second ledges. For example, the closer the first ledge 150 is to the top edge 116 of the corner region 110, the closer nestable containers may be stacked together. However, it is to be appreciated that the further apart the first ledge 150 is from the top edge 116 of the corner region 110, the less likely the container bodies 102 are to stick together. In some exemplary configurations, the first ledge 150 may be positioned at least 20 millimeters from the top edge 116. In other exemplary configurations, the first ledge 150 may be positioned at least 25 millimeters from the top edge 116.

The first ledge 150 may be configured in various ways. For example, as shown in FIGS. 2A and 2B, the first ledge 150 may extend from one side wall 106 to an adjoining side wall 106. In other exemplary configurations, the first ledge 150 may extend along only a portion of the corner region 110. The proximal end region 152 of the first ledge 150 may comprise a groove 158 and the distal end region 154 of the first ledge 150 may comprise a ridge 156. The ridge 156 of the first ledge 150 may have a curved shape. As such, the shape of the ridge 156 may correspond with the shape of the corner region 110. As shown in FIG. 2B, the ridge 156 may extend along only a portion of the first ledge 150. In some exemplary configurations, the ridge 156 may extend along the entire length of the first ledge 150. The groove 158 of the first ledge 150 may be substantially flat as shown in FIG. 2B. Or, in other exemplary configurations, the groove 158 of the first ledge 150 may have an arcuate shape.

Figure 8:
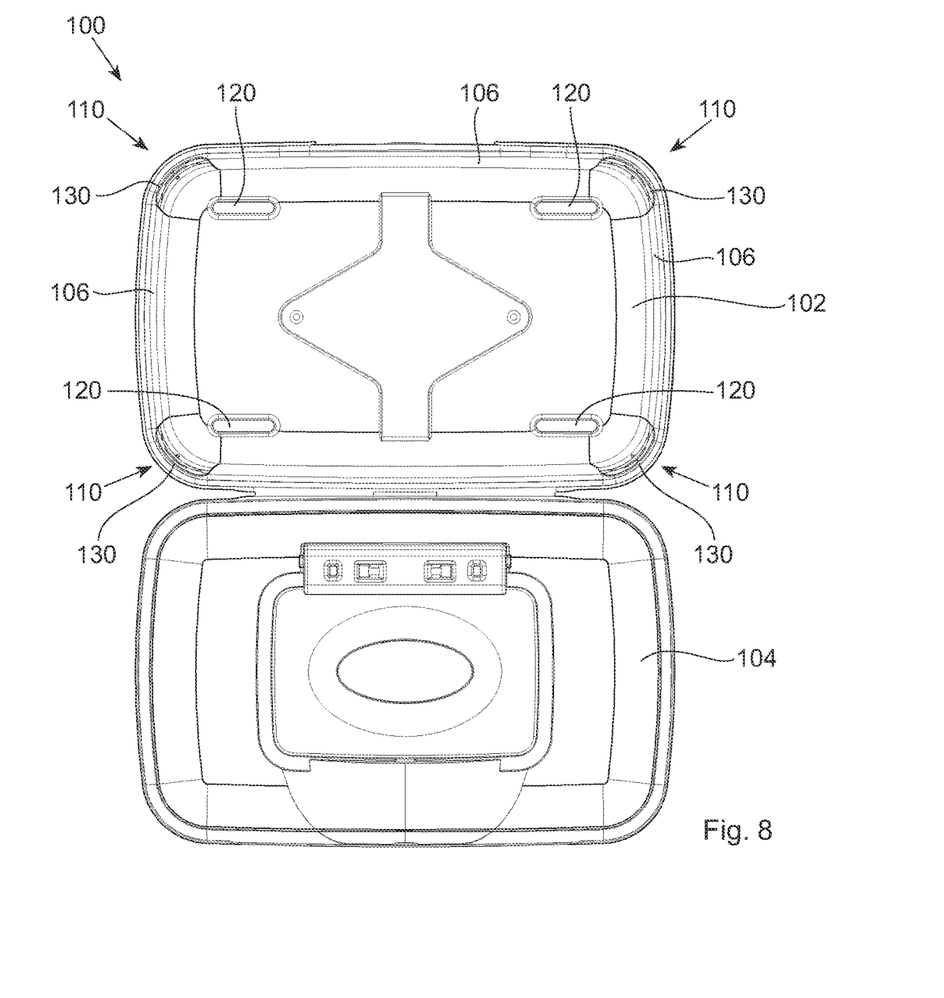
FIG. 8 is a plan view of an interior space of a nestable container having a lid in an open configuration.

The second ledge 130 may be configured in various ways. For example, as shown in FIGS. 1A, 1B, and 8, in some exemplary configurations, the second ledge 130 may extend from a side wall 106 to an adjoining side wall 106. In other exemplary configurations, the second ledge 130 may extend along only a portion of the corner region 110. The proximal end region 132 of the second ledge 130 may comprise a groove 138 and the distal end region 134 of the second ledge 130 may comprise a ridge 136. The ridge 136 of the second ledge 130 may have a curved shape. As such, the shape of the ridge 136 may correspond with the shape of the corner region 110. As shown in FIG. 1B, the ridge 136 may extend along only a portion of the second ledge 130. In some exemplary configurations, the ridge 136 may extend along the entire length of the second ledge 130. The groove 138 of the second ledge 130 may be substantially flat as shown in FIG. 1B. Or, in other exemplary configurations, the groove 138 of the second ledge 130 may have an arcuate shape.

To increase the strength of the corner region, the corner region 110 may include various features. For example, as shown in FIG. 1B, the corner region 110 may include a reinforced region 142 located proximate to the second ledge 130. The reinforced region 142 may protrude from the interior surface 122 of the corner region 110. The reinforced region 142 may extend from the second ledge 130 and taper toward the bottom edge 118 of the corner region 110. The reinforced region 142 has a thickness. The thickness of the reinforced region 142 may be greater than the thickness of the corner region 110 between the second ledge 130 and the top edge 116 of the corner region 110. It is to be appreciated that the reinforced region 142 may provide additional strength to the corner region 110 near the second ledge 130.

To provide additional strength to the corner regions 110 of the container body 102, the corner region 110 may include one or more ribs. As shown in FIGS. 1A and 1B, the corner region 110 may include a first rib 160 protruding from the interior surface 122 of the corner region 110. The first rib 160 may extend from the first ledge 150 toward the bottom edge 118 of the corner region 110. While FIG. 1B shows a single, first rib 160 extending from the first ledge 150 toward the bottom edge 118 of the corner region 110, it is to be appreciated that the corner region 110 may comprise one or more first ribs 160 protruding from the interior surface 122 of the corner region 110 and extending from the first ledge 150 toward the bottom edge 118. In some exemplary configurations, the first rib 160 may extend in a different direction. The first rib 160 may have a linear shape. The first rib 160 may taper from the first ledge 150 toward the bottom edge 118. That is, the first rib 160 may protrude farther from the interior surface 122 of the corner region 110 proximate the first ledge 150 than nearest to the bottom edge 118. It is to be appreciated that the first rib 160 may provide additional strength to the corner region 110 to prevent the corner region 110 from collapsing into an adjacent nestable container when the nestable container 100 is stacked with one or more similar nestable containers. The first rib 160 may be configured in various shapes and dimensions. The first rib 160 may have a flat outer surface, or the first rib 160 may have a curved outer surface.

As shown in FIGS. 1A and 1B, the corner region 110 may include one or more second ribs 140 protruding from the interior surface 122 of the corner region 110. The second rib 140 may extend from the top edge 116 of the corner region 110 to the second ledge 130. The second rib 140 may have a linear shape. The second rib 140 may have a curved outer surface. As discussed in more detail below, the second rib 140 may restrict movement of a second, nestable container that is stacked inside of the nestable container 100. As shown in FIG. 1B, the corner region 110 may include a plurality of second ribs 140 spaced apart and extending from the top edge 116 of the corner region 110 to the second ledge 130.

Figure 4:
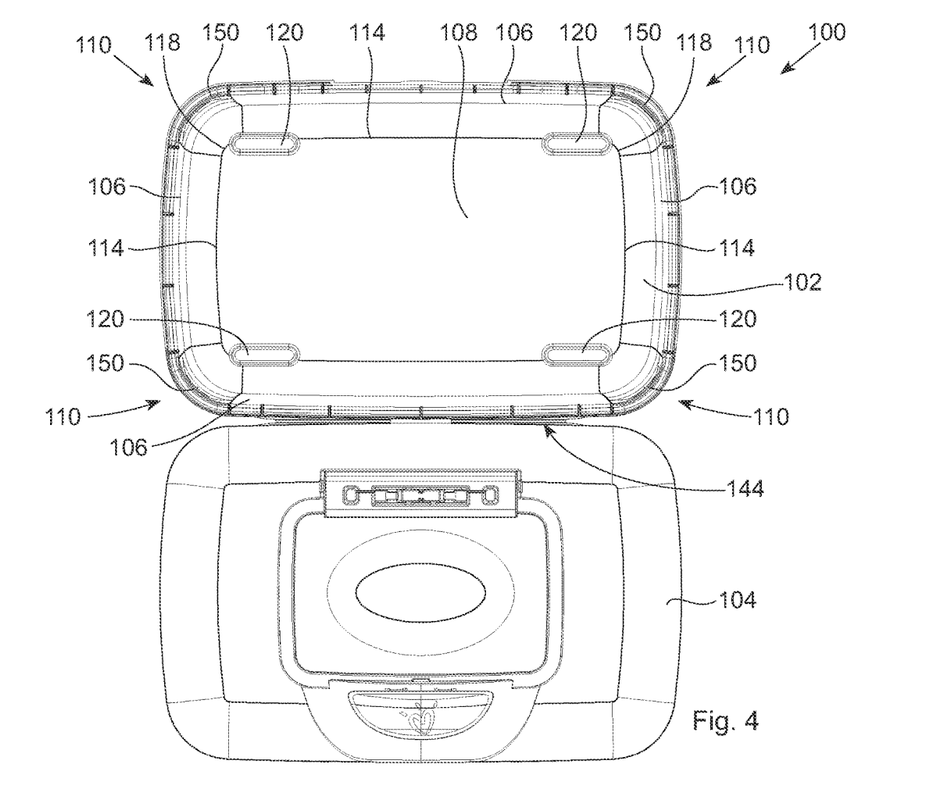
FIG. 4 is a plan view of an exterior space of a nestable container having a lid in an open configuration.
Figure 5:
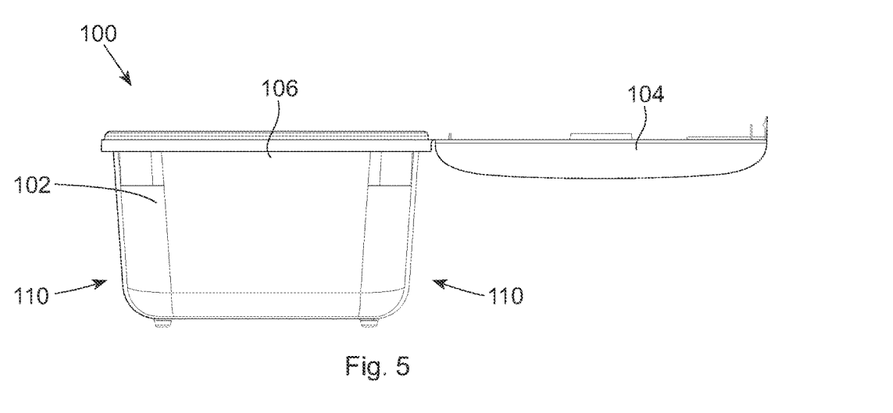
FIG. 5 is a side, elevation view of a nestable container having a lid in an open configuration.
Figure 6:
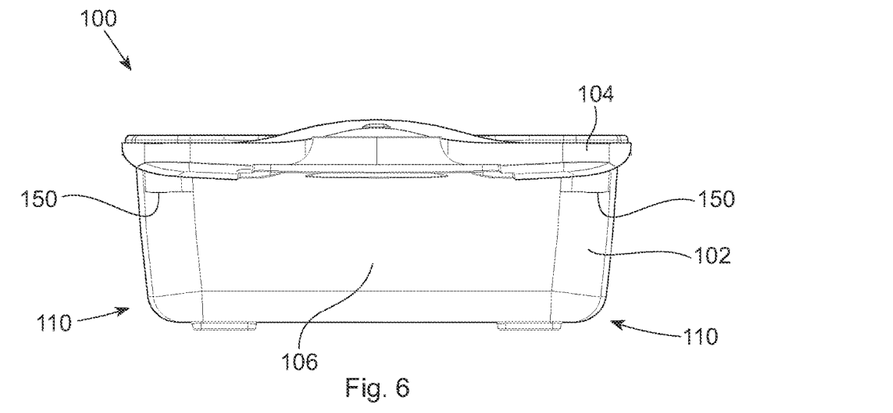
FIG. 6 is a back, elevation view of a nestable container having a lid in an open configuration.
Figure 7:
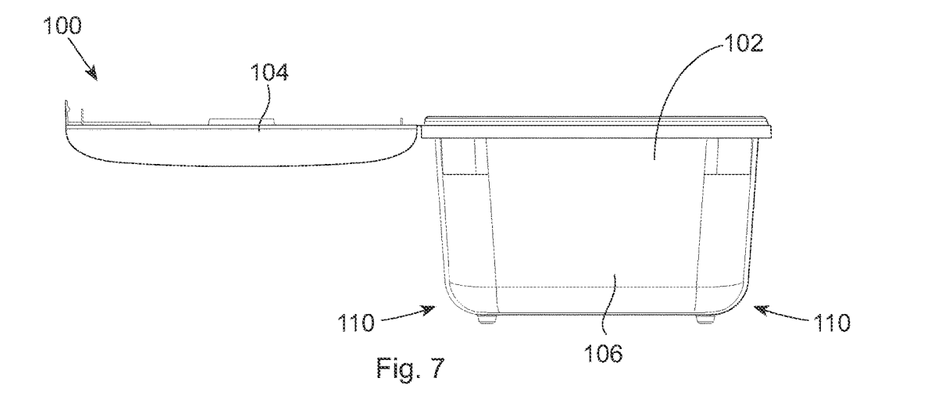
FIG. 7 is a side, elevation view of a nestable container having a lid in an open configuration.

As previously mentioned, the nestable container 100 may include a lid 104. As shown in FIGS. 1A and 4, the lid 104 is connectable with a side wall 106. In some exemplary configurations, a hinge 144 may connect the lid 104 with a side wall 106. The lid 104 and the container body 102 may be configured as a continuous structure, such as shown in FIGS. 1A and 2A. In such an exemplary configuration, the hinge 144 may be configured as a "living hinge." A "living hinge" is a joint created by an area or zone of weakness in the nestable container 100 by a process such as injection molding. The lid 104 and the container body 102 are connected by the "living hinge." In other exemplary configurations, the lid 104 may be completely detachable from the side wall 106 of the container body 102. The lid 104 may include an orifice 172 for dispensing wipes. Exemplary lids for nestable containers are described in U.S. Patent Publication No. 2012/0074142.

As shown in FIGS. 1A, 2A, and 3-8, the container body 102 may include a plurality of feet 120. The feet 120 may protrude from the bottom wall 108. The feet 120 may be arranged in the corners of the bottom wall 108. It is to be appreciated that the feet 120 may be arranged in various configurations. The feet 120 may have various shapes and may have various sizes.

The nestable container and any component thereof may be made of a variety of materials. For example, it may be desirable for the nestable container to be made of a material that is impermeable to liquid and/or vapor in a configuration. For example, wet wipes comprising 10%, 25%, 50%, 75%, or even 95% by weight of water, based upon the nominal weight of the wet wipes, may be stored in the nestable container. If a wet wipe loses too much moisture as a result of a nestable container that is pervious to liquid and/or vapor, it may not provide the desired cleaning benefit. Forming at least part of the nestable container from a water and/or vapor impermeable material may at least help reduce the rate and/or amount of moisture lost by the wet wipes. Exemplary materials include, but are not limited to, thermoplastic resins, including resins of polypropylene, polystyrene, acrylonitrile butadiene styrene (ABS), polyester, polyvinyl chloride, polycarbonate, or combinations thereof. By combinations thereof, it is meant both that the resin used to form the nestable container and/or different components of the nestable container, may be formed from different resins or resin mixtures. For example, the container body 102 and the lid 104 may be made of the same material. Or, in other exemplary configurations, the container body 102 and the lid 104 may be made of a different material. The nestable container may be formed by any suitable manufacturing process, including injection molding or thermoforming.

Figure 9:
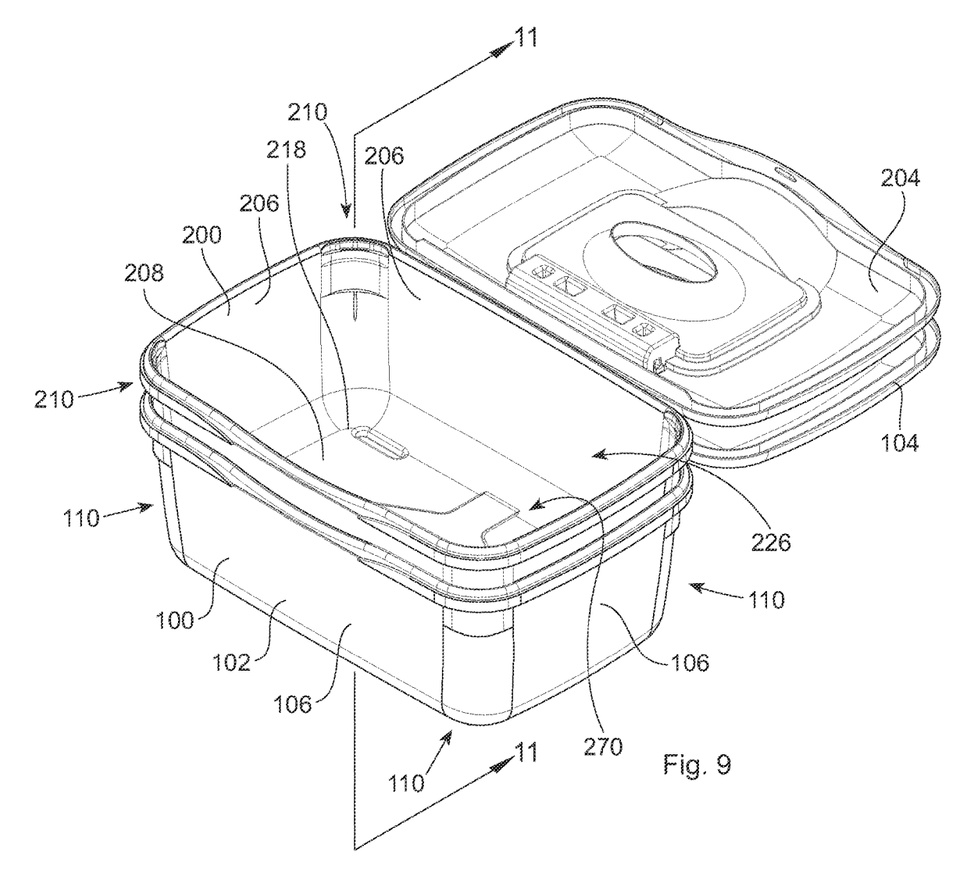
FIG. 9 is a side, perspective view of two nestable containers stacked one on top of another.
Figure 10:
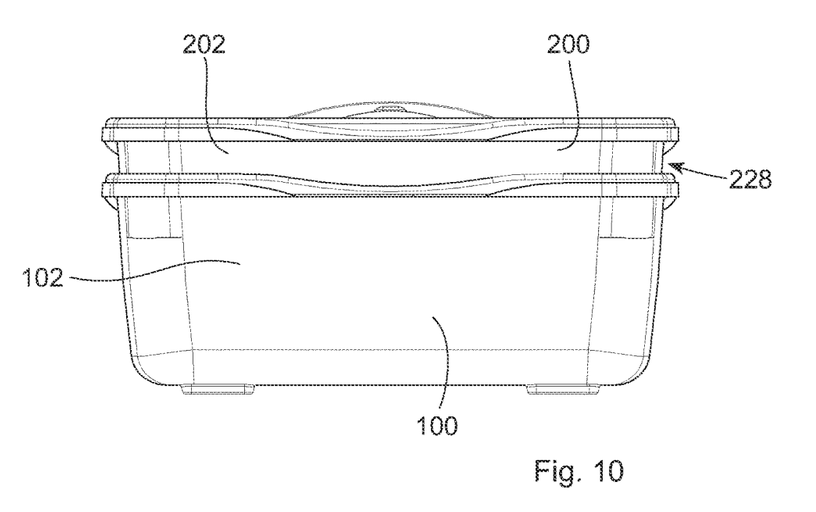
FIG. 10 is a front; elevation view of two nestable containers stacked one on top of another.
Figure 11:
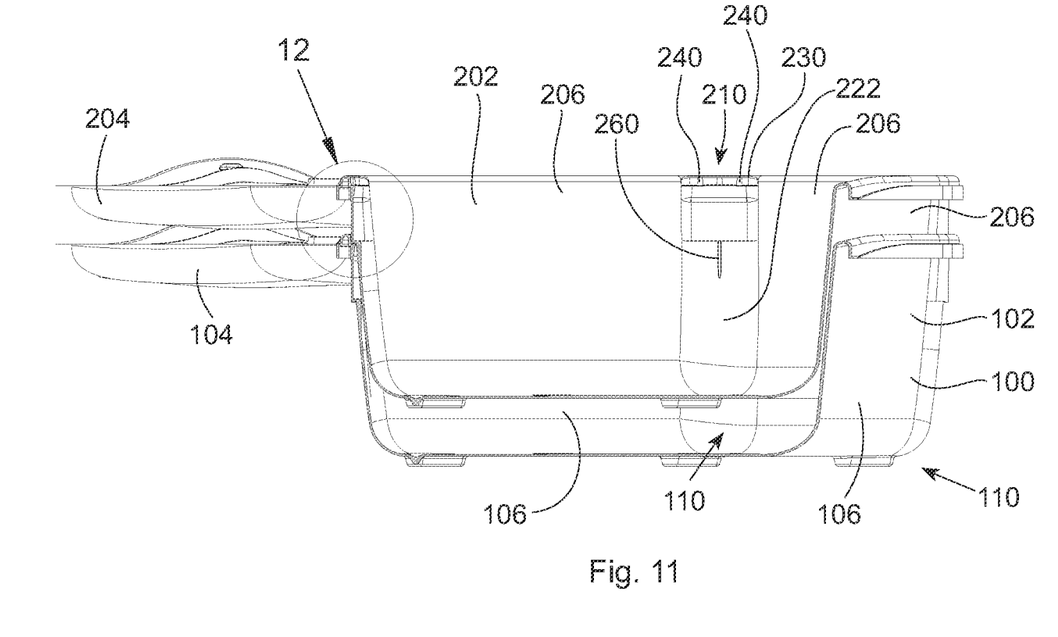
FIG. 11 is a sectional view of two nestable containers stacked one on top of another taken along line 11-11 in FIG. 9.

As shown in FIGS. 9-11, a first nestable container 100 is adapted to stack with a second nestable container 200 such that the first nestable container 100 is subjacent to the second nestable container 200. It is to be appreciated that the first and second nestable containers 100 and 200 may stack with a plurality of similar nestable containers. Like the first nestable container 100 described above, the second nestable container 200 may include a container body 202 and a lid 204. The container body 202 may include a bottom wall 208 and a plurality of side walls 206 connected with the bottom wall 208. The container body 202 may include an interior space 226 and an exterior space 228. The container body 202 may have an open end 270 opposite of the bottom wall 208. Adjacent side walls 206 may be connected together in a corner region 210 of the container body 202. The side walls 106 and 206 of the first and second nestable containers 100 and 200 are sloped such that the container body 202 of the second container 200 may nest with the container body 102 of the first nestable container 100.

Figure 12:
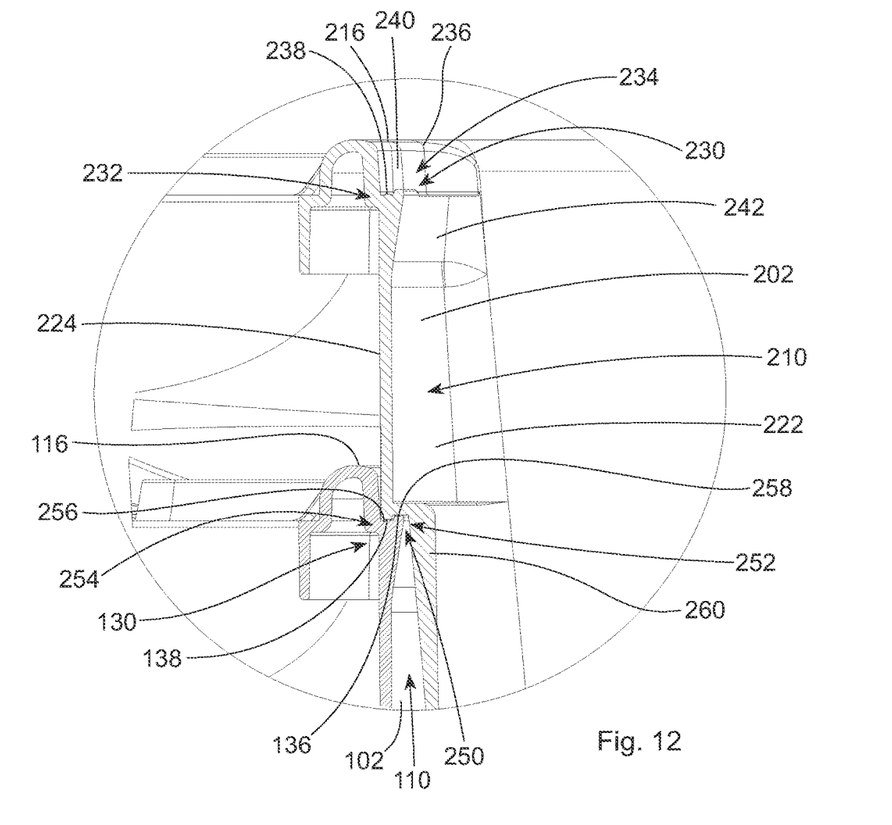
FIG. 12 is a magnified view of a portion of two nestable containers stacked one on top of another taken from FIG. 11.

The second nestable container 200 may include one or more ledges. For example, as shown in FIGS. 11 and 12, the corner region 210 of the second nestable container 200 may include a first ledge 250 and a second ledge 230. As shown in FIG. 12, the first ledge 250 may include a proximal end region 252 and a distal end region 254. The proximal end region 252 of the first ledge 250 may be connected with the exterior surface 224 of the corner region 210. The proximal end region 252 of the first ledge 250 may comprise a groove 258 and the distal end region 254 of the first ledge 250 may comprise a ridge 256. As shown in FIG. 12, the second ledge 230 may include a proximal end region 232 and a distal end region 234. The proximal end region 232 of the second ledge 230 may be connected with the interior surface 222 of the corner region 210. The proximal end region 232 of the second ledge 230 may comprise a groove 238 and the distal end region 234 of the first ledge 230 may comprise a ridge 236.

As shown in FIG. 12, the first ledge 250 of a second nestable container 200 aligns with the second ledge 130 of a first nestable container 100. The second ledge 130 of the first nestable container 100 provides a surface for the first ledge 250 of the second nestable container 200 to rest upon. When the container body 202 of the second container 200 is stacked with the container body 102 of the first nestable container 100, a portion of the exterior surface 224 of the corner region 210 of the container body 202 of the second container 200 between the first ledge 250 and the top edge 216 is in a facing relationship with the interior surface 122 of the corner region 110 of the container body 102 of the first nestable container 100. The ridge 256 of the first ledge 250 of the second nestable container 200 and the groove 138 of the second ledge 130 of the first nestable container 100 are adapted to fit together; likewise, the groove 258 of the first ledge 250 of the second nestable container 200 and the ridge 136 of the second ledge 130 of the first nestable container 100 are adapted to fit together. Fitting the groove 138 of the first nestable container 100 into the ridge 256 of the second nestable container 200 helps to restrict movement of the second nestable container 200 relative to the first nestable container 100 and prevent the second nestable container 200 from getting stuck inside of the first nestable container 100.

The corner region 210 of the second nestable container 200 may comprise a plurality of ribs. For example, as shown in FIGS. 9, 11, and 12, the corner region 210 of the second nestable container 200 may include a first rib 260 protruding from the interior surface 222 of the corner region 210. The first rib 260 may extend from the first ledge 250 toward a bottom edge 218 of the corner region 210. The corner region 210 of the second nestable container 200 may also include a plurality of second ribs 240. The second rib 240 may project from the interior surface 222 of the corner region 210 and may extend from the top edge 216 of the corner region 210 to the second ledge 230.

The corner region 210 of the second nestable container 200 may include a reinforced region 242. The reinforced region 242 may be located proximate to the second ledge 230. The reinforced region 242 may extend from the second ledge 230 and taper toward the bottom edge 218 of the corner region 210.

With continuing reference to FIGS. 11 and 12, the first rib 260 of the corner region 210 of the container body 202 provides additional strength to the corner region 210 of the container body 202. A relatively strong corner region 210 near the first ledge 250 minimizes the ability of the container body 202 to deform under an applied force and get stuck in the container body 102 of the first nestable container 100. In addition, the reinforced region 242 of the container body 202 provides additional strength to the corner region 210 of the container body 202 of the second container 200 near the second ledge 230.

Referring to FIGS. 11 and 12, the second rib 140 helps limit movement of the container body 202 of the second container 200 relative to the container body 102 of the first nestable container 100. The second rib 140 decreases the space between the interior surface 122 of the corner region 110 of the container body 102 of the first nestable container 100 and the exterior surface 224 of the corner region 210 of the container body 202 of the second container 200. As a result, the container body 202 of the second container 200 is limited in movement relative to the container body 102 of the first nestable container 100.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. First and second nestable wet wipes containers, each comprising:
   a container body comprising a non-square but substantially rectangular bottom wall, side walls, and a corner region, wherein the corner region includes an interior surface and an opposing exterior surface;
   a lid hingedly attached to the container body, wherein the lid defines an orifice for dispensing wet wipes;
   a horizontally extending first ledge disposed in the corner region and including a proximal end region and a distal end region, the proximal end region connected with the exterior surface of the corner region, wherein the proximal end region of the first ledge comprises a first groove with a vertical recession into the first ledge and the distal end region of the first ledge comprises a first ridge with a vertical extension out of the first ledge; and
   a horizontally extending second ledge disposed in the corner region above the first ledge and including a proximal end region and a distal end region, the proximal end region connected with the interior surface of the corner region, wherein the proximal end region of the second ledge comprises a second groove with a vertical recession into the second ledge and the distal end region of the second ledge comprises a second ridge with a vertical extension out of the second ledge;
   wherein the first ridge of the first ledge and the second groove of the second ledge each extend horizontally about the corner region and are configured such that the first ridge of the first ledge fits into the second groove of the second ledge when the first and second nestable containers are nestably stacked with the first nestable container placed inside the second nestable container; and
   wherein the first ridge of the first ledge and the second groove of the second ledge do not extend along the entirety of a horizontal perimeter about the side walls.

2. The first and second nestable wet wipes containers of claim 1, wherein the corner region of each is curved.

3. The first and second nestable wet wipes containers of claim 1, wherein the side walls of each comprise first and second opposing side walls and third and fourth opposing side walls, wherein the first, second, third, and fourth side walls are connected with the bottom wall.

4. The first and second nestable wet wipes containers of claim 1, wherein the corner region of each defines a top edge located along an edge most distal from the bottom wall, and each further comprises a rib protruding from the interior surface of the corner region and extending from the second ledge toward the top edge.

5. The first and second nestable wet wipes containers of claim 4, wherein the first ledge of each is located between the second ledge and the bottom wall.

6. The first and second nestable wet wipes containers of claim 5, wherein the first ledge of each is located nearer to the top edge than to the bottom wall.

7. The first and second nestable wet wipes containers of claim 1, wherein the side walls of each slope outward from the bottom wall.

8. The first and second nestable wet wipes containers of claim 1, wherein the corner region of each has a first thickness and the side walls have a second thickness, wherein the first thickness is greater than the second thickness.

9. The first and second nestable wet wipes containers of claim 1, wherein the corner region of each comprises a reinforced region located proximate to the second ledge.

10. First and second nestable wet wipes containers, each comprising:
    a container body comprising a non-square but substantially rectangular bottom wall, side walls, and a corner region, wherein the corner region includes an interior surface and an opposing exterior surface;
    a lid defining an orifice for dispensing wet wipes therethrough;
    a horizontally extending first ledge disposed in the corner region and including a proximal end region and a distal end region, the proximal end region connected with the exterior surface of the corner region, wherein the proximal end region of the first ledge comprises a first groove with a vertical recession into the first ledge and the distal end region of the first ledge comprises a first ridge with a vertical extension out of the first ledge; and
    a horizontally extending second ledge disposed in the corner region above the first ledge and including a proximal end region and a distal end region, the proximal end region connected with the interior surface of the corner region, wherein the proximal end region of the second ledge comprises a second groove with a vertical recession into the second ledge and the distal end region of the second ledge comprises a second ridge with a vertical extension out of the second ledge;

wherein the first ridge of the first ledge and the second groove of the second ledge each extend horizontally about the corner region and are configured such that the first ridge of the first ledge fits into the second groove of the second ledge when the first and second nestable containers are nestably stacked with the first nestable container placed inside the second nestable container; and wherein the first ridge of the first ledge and the second groove of the second ledge do not extend along the entirety of a horizontal perimeter about the side walls.

11. The first and second nestable wet wipes containers of claim 10, wherein the corner region of each is curved.

12. The first and second nestable wet wipes containers of claim 10, wherein the side walls of each comprise first and second opposing side walls and third and fourth opposing side walls, wherein the first, second, third, and fourth side walls are connected with the bottom wall.

13. The first and second nestable wet wipes containers of claim 10, wherein the corner region of each defines a top edge located along an edge most distal from the bottom wall, and each further comprises a rib protruding from the interior surface of the corner region and extending from the second ledge toward the top edge.

14. The first and second nestable wet wipes containers of claim 13, wherein the first ledge of each is located between the second ledge and the bottom wall.

15. The first and second nestable wet wipes containers of claim 14, wherein the first ledge of each is located nearer to the top edge than to the bottom wall.

16. The first and second nestable wet wipes containers of claim 10, wherein the side walls of each slope outward from the bottom wall.

17. The first and second nestable wet wipes containers of claim 10, wherein the corner region of each has a first thickness and the side walls have a second thickness, wherein the first thickness is greater than the second thickness.

18. The first and second nestable wet wipes containers of claim 10, wherein the corner region of each comprises a reinforced region located proximate to the second ledge.

19. First and second nestable wet wipes containers, each comprising:

a container body comprising a non-square but substantially rectangular bottom wall, side walls, and a corner region, wherein the corner region includes an interior surface and an opposing exterior surface;

a lid defining an orifice for dispensing wet wipes therethrough;

a horizontally extending first ledge disposed in the corner region and including a proximal end region and a distal end region, the proximal end region connected with the exterior surface of the corner region, wherein the proximal end region of the first ledge comprises a first groove with a vertical recession into the first ledge and the distal end region of the first ledge comprises a first ridge with a vertical extension out of the first ledge;

a horizontally extending second ledge disposed in the corner region above the first ledge and including a proximal end region and a distal end region, the proximal end region connected with the interior surface of the corner region, wherein the proximal end region of the second ledge comprises a second groove with a vertical recession into the second ledge and the distal end region of the second ledge comprises a second ridge with a vertical extension out of the second ledge;

a first rib protruding from the interior surface of the corner region and extending from the first ledge toward the bottom wall;

wherein the first ridge of the first ledge and the second groove of the second ledge each extend horizontally about the corner region and are configured such that the first ridge of the first ledge fits into the second groove of the second ledge when the first and second nestable containers are nestably stacked with the first nestable container placed inside the second nestable container; and wherein the first ridge of the first ledge and the second groove of the second ledge do not extend along the entirety of a horizontal perimeter about the side walls.

* * * * *